United States Patent [19]
Harasta

[11] 3,966,532
[45] June 29, 1976

[54] METHOD OF MAKING WATER COLOR PICTURES READY FOR FRAMING

[76] Inventor: Ruth P. Harasta, 1434 Oakdale Road, Johnson City, N.Y. 13790

[22] Filed: Dec. 5, 1974

[21] Appl. No.: 529,960

Related U.S. Application Data

[63] Continuation of Ser. No. 352,605, April 19, 1973, abandoned.

[52] U.S. Cl. ................................ 156/344; 156/257; 156/268; 156/303.1; 427/290; 428/46; 428/48; 156/248

[51] Int. Cl.[2] ...................... B32B 7/06; B32B 31/18; B29D 3/00; B44D 1/32

[58] Field of Search ................ 161/250, 406; 117/4, 117/11; 156/248, 257, 268, 303.1, 247, 344; 427/289, 290; 428/46, 48

[56] References Cited

UNITED STATES PATENTS

| | | | |
|---|---|---|---|
| 1,595,581 | 8/1926 | Stedman | 156/248 X |
| 1,845,016 | 2/1932 | D'Atri | 427/289 X |
| 2,876,575 | 3/1959 | Leika | 156/248 X |
| 3,002,309 | 10/1961 | Snyder | 156/248 X |
| 3,810,812 | 5/1974 | Koenig | 161/231 X |

*Primary Examiner*—Philip Dier
*Attorney, Agent, or Firm*—Richard G. Stephens

[57] ABSTRACT

Water-color pictures having neat border edges rendering them suitable for framing are made by cutting a rectangular opening of a desired size through a ruled transparent plastic top sheet adhesively secured in removable fashion to a back sheet of water-color paper and removing the cut portion of the plastic sheet to provide a sight area within which a picture or the like may be colored. The remaining portion of the plastic sheet-framing the sight area prevents the watercolors from extending beyond the sight area, and upon completion of the coloring, the remaining portion of the plastic sheet is stripped from the back sheet, whereupon the back or mat sheet is then ready for framing and/or display.

6 Claims, 7 Drawing Figures

METHOD OF MAKING WATER COLOR PICTURES READY FOR FRAMING

This application is a continuation of my prior copending Application Ser. No. 352,605 filed April 19, 1973, now abandoned.

My invention relates to an art supply material and to a method for producing watercolor pictures and the like. Watercolor pictures are commonly made on watercolor paper available from a number of suppliers, such paper being provided with a matte finish such that it will readily absorb a colored water, ink or dye. Watercoloring tends to require a somewhat steadier hand than oil painting or chalk, ink or pencil drawing due to the fluidity of water and its tendency to run. In usual prior art watercolor practice an artist has first formed a sight area on a sheet of watercolor paper by pasting strips of masking tape on the sheet so that they frame a rectangular sight area within which he may paint a picture. Alignment of the separate strips of masking tape on the sheet so that they accurately form a rectangle of the desired size is a tedious and time-consuming operation fraught with error. One must hold the strip semi-taut and tend to place it perfectly in place, since it may not be slid or turned once it adheres to the watercolor sheet. One object of the present invention is to provide method and apparatus which obviates the need for such a procedure. While the method and apparatus of the invention are particularly advantageous in connection with watercoloring, they are also highly useful in connection with crayon, chalk, charcoal or pencil drawings, oil painting and acryllic and air brush rendering.

In the abovementioned prior art process, the artist strips the masking tape from the watercolor sheet after the picture which he has painted has dried. It is difficult to apply the strips of masking tape to the watercolor sheet with a uniform, measured pressure, particularly while simultaneously attempting to align them, and hence the different strips of masking tape, and different portions of a given strip of tape, tend to adhere to the watercolor sheet with varying degrees of adhesiveness. If the artist presses a masking strip against the watercolor paper with too much pressure, later removal of the strip may tear up a portion of the watercolor paper and ruin the picture. If, on the other hand, a portion of a masking strip is pressed against the watercolor paper with insufficient firmness, the watercoloring can seep under that portion of the strip, providing a jagged, messy border section at an edge of the picture. Another object of the invention is to provide a method and apparatus which overcomes any requirement that the artist manipulate any adhesive strip with great care.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

In accordance with a central concept of the present invention, an assembly is formed comprising a water-impervious flexible plastic sheet 10 which is superimposed on and adhesively secured to a back sheet 11 of conventional watercolor paper, bristol board, or the like. While a variety of different plastics may be used, thin polyethylene sheeting is deemed eminently suitable. Plastic sheet 0.004 inch thick has proven suitable. In most applications of the invention the paper backsheet will be at least ten times as thick as the flexible plastic sheet. The plastic sheet is preferably the same size as the back sheet, and it is contemplated that assemblies typically letter-size or legal size will be formed by shearingly subdividing larger sheets. A web or strip of plastic sheet and a web or strip of watercolor paper, bristol board or the like may be passed together between two rolls with an adhesive applied to the plastic sheet, so that the strips are pressed together with uniform pressure, and then the superimposed webs may be sheared into assemblies of desired size. A variety of different adhesives may be used. It is necessary, of course, that the adhesive be a non-drying type and that it be thick and gummy enough that it not seep appreciably into the surface of the paper back mat 11. Various adhesives commonly used for installing kitchen shelf paper, in a removable fashion are eminently suitable. "Con-Tact" brand, clear, transparent, adhesive-coated plastic available from Comack Plastics Division, United Merchants and Manufacturers, 1407 Broadway, New York, N.Y., has been successfully used with various types of paper back sheets. The following types of commercially-available paper are deemed suitable for use as the back sheet: Strathmore Alexis water color paper No. 440-(1)-(3), 130 lb. or Strathmore bristol board, medium surface, 2 ply, Strathmore Paper Co., Westfield, Mass.; Crescent Illustration Board No. 300, medium weight, cold press surface, Crescent Cardboard Co., 100 W. Willow Road B-5, Wheeling, Illinois; Bainbridge Board No. 80, single thick; No. 169 or No. 90-R, available from Charles T. Bainbridge's Sons, 20 Cumberland St., Brooklyn, N.Y.; Aquabee Bristo Board No. 1771, vellum finish, 2 ply and Aquabee water color paper, No. 1142 available from Bee Paper Co. Inc., 100 Eighth Street, Passaic, New Jersey; Grumbacher Harmony water color paper No. 7182-2 available from M. Grumbacher Inc., 460 West 34th Street, New York, New York 10001.

It is also important, of course, that the adhesive not color the surface of the paper, and that the adhesive remain on the plastic strip and be substantially entirely removed from the back mat when the plastic top sheet is pulled from the back mat, as will be explained below.

Plural assemblies of the type described may be stacked atop one another and fastened along one edge using a gummed strip or the other binding to form a convenient tablet.

Figure 1:
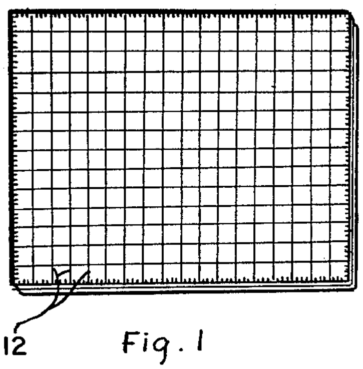
FIG. 1 illustrates an assembly according to the invention comprising a ruled transparent plastic top sheet superimposed on and adhesively secured to a back sheet of watercolor paper.
Figure 2:
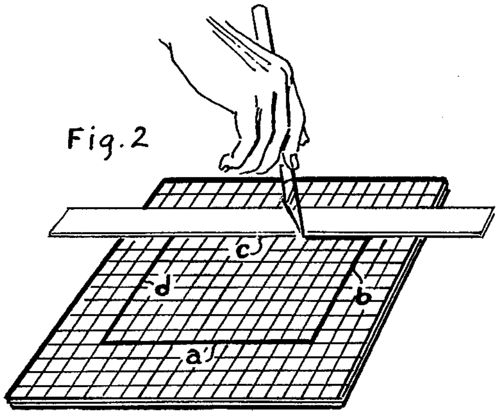
FIG. 2 shows the plastic sheet of the assembly of FIG. 1 being cut to form a desired sight area.

As shown in FIG. 1, the plastic top sheet is provided with a printed grid of horizontal and vertical lines 12, 12 spaced apart 1 inch, for example, although a lesser or greater spacing may be used, if desired. As shown in FIG. 1 around the edges of the sheet, each square of the grid may be subdivided by graduated lines, and though not shown, various of the lines may be numbered to facilitate rapid provision of a sight area of a desired size. Preparatory to producing a picture, the artist cuts along selected ones of the printed lines, or cuts parallel to selected lines using a straightedge, cutting entirely through the plastic top sheet, but only partially through the back mat, This operation may be performed easily using a knife or razor blade as in FIG. 2, and making four straight line cuts, such as those shown at *a* through *d* in FIG. 2.

Figure 3:
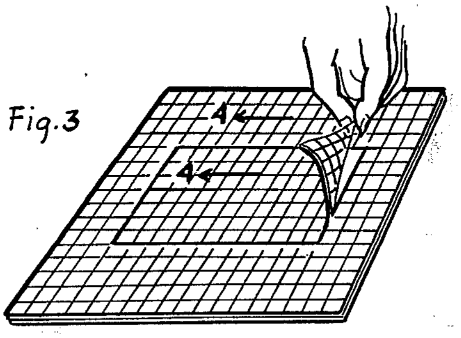
FIG. 3 shows the portion of the plastic sheet cut in FIG. 2 being removed from the assembly.
Figure 4:
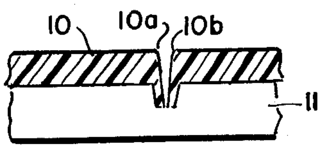
FIG. 4 is a cross-section view taken at lines 4—4 in FIG. 3.
Figure 5:
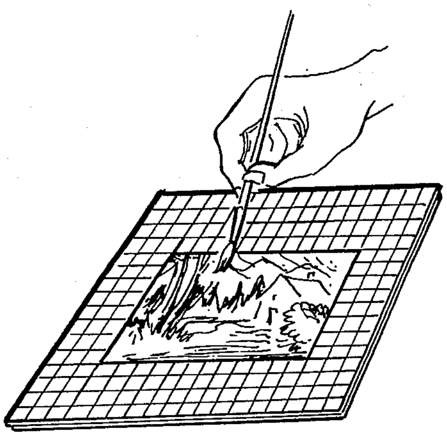
FIG. 5 shows a picture being colored within the sight area.
Figure 6:
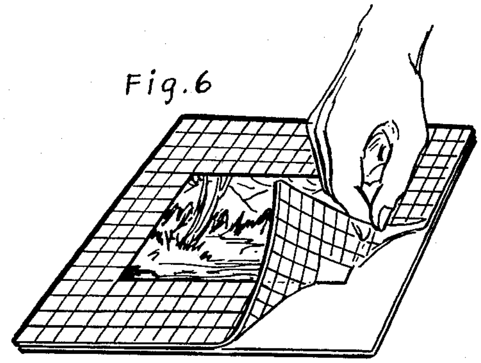
FIG. 6 shows the remaining portion of the plastic sheet being removed after the picture has dried.
Figure 7:
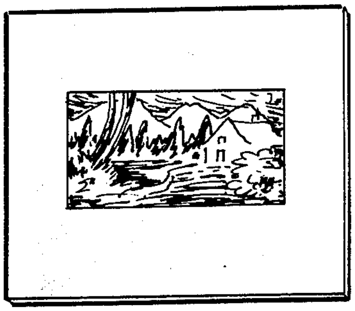
FIG. 7 is a view of a completed picture suitable for framing.

The portion of plastic sheet encompassed by the lines *a-d* is then stripped from the back sheet as shown in FIG. 3, leaving a rectangular sight area. Stripping the cut portion is easily accomplished by initially lifting one corner with the knife enough so that the corner can be grasped by thumb and forefinger and then merely pulling the cut portion loose. It is not necessary, of course, that the portion of plastic sheet initially stripped away be rectangular, as the artist may if he desires, cut away portions of different shapes, and if desired, circles, ovals, etc., (not shown) may be printed on the plastic top sheet to aid such cutting. The cutting of the top plastic sheet also performs the highly desirable function of providing a seal around the sight area. As is shown in exaggerated form in the cross-section view of FIG. 4, each knife cut presses the cut edges 10*a*, 10*b* of the plastic sheet 10 down into the back mat 11, and insures that the remaining edges of the plastic sheet surrounding the cut-out portion are pressed tightly against the back mat, preventing any watercolor from seeping beyond those edges as a picture is being colored. This allows the artist to color as close to the edges of the sight area as he desires, and he may allow watercolor to slop over beyond the edges of the sight area onto remaining portions of the plastic sheet. Thus he may color the sight area rapidly without exercising extreme care adjacent its edges. Even if enough watercolor is applied to "soak" an edge portion of the sight area, the partial knife cut and downwardly bent portion of the plastic sheet prevents color from flowing beyond the knife cut. If an extreme amount of fluid is applied, it will be seen that fluid theoretically could seep through the lower uncut portion of the back sheet. However, any such fluid seepage still will be seen to cause no harm unless it is so great that it then seeps still further, upwardly to the surface of the back sheet. Such an extreme amount of seepage is easily avoided, however, and unlikely to occur unless the artist deliberately and repeatedly wets the edge portion of the sight area with an extreme amount of fluid. After the sight area has been colored as desired, any fluid coloring thereon is allowed to dry, after which the remaining portions of the plastic sheet are stripped away, as illustrated in FIG. 6, thereby leaving a completed picture suitable for framing, as shown in FIG. 7.

While it is not absolutely necessary that the plastic top sheet be transparent, it is preferred that it be transparent. The indicia lines provided on the plastic sheet should be waterproof if printed on the side of the plastic sheet adjacent the back mat, but need not be waterproof if provided on the outer side of the plastic sheet.

It will thus be seen that objects set forth above, among those made apparent from the preceding description, are efficiently attained. Since certain changes may be made in carrying out the above method and in the construction set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of making a work of art comprising the steps of cutting through an adhesive-bearing plastic sheet which is adhesively removably secured to a back sheet to circumscribe an area of said plastic sheet, removing said circumscribed area of said plastic sheet together with the adhesive carried by said area of said plastic sheet to provide an open sight area substantially devoid of adhesive on said back sheet, applying coloring materials to portions of said sight area, and stripping the remaining portions of said adhesive-bearing plastic sheet from said back sheet to provide a work of art then ready for framing.

2. The method according to claim 1 wherein said step of cutting comprises cutting through said plastic sheet along at least one guideline carried on said plastic sheet.

3. The method according to claim 1 wherein said step of cutting comprises simultaneously cutting partially through said back sheet to press cut edges of said plastic sheet into partially cut portions of said back sheet, thereby inhibiting seepage of said coloring material from said sight area underneath said remaining portions of said plastic sheet.

4. The method of making a work of art ready for framing comprising the steps of cutting through an adhesive-bearing transparent plastic sheet which is adhesively removably secured to an opaque paper back sheet to circumscribe an area of said plastic sheet, stripping said circumscribed area of said plastic sheet together with the adhesive carried by said area of said plastic sheet to provide an open sight area substantially devoid of adhesive on said back sheet, applying liquid-containing coloring materials to portions of said sight area, and stripping the remaining portions of said adhesive-bearing plastic sheet from said back sheet to provide a work of art having a surrounding border portion substantially devoid of adhesive.

5. The method according to claim 4 wherein said liquid-containing coloring materials are allowed to dry after being applied to said sight area before said remaining portions of said adhesive-bearing plastic sheet are stripped from said back sheet.

6. The method according to claim 4 wherein said step of cutting comprises cutting along four straight lines to provide a rectangular sight area.

* * * * *